(12) United States Patent
Minakata et al.

(10) Patent No.: US 6,226,423 B1
(45) Date of Patent: May 1, 2001

(54) OPTICAL WAVEGUIDE ELEMENT

(75) Inventors: Makoto Minakata, Hamamatsu; Jungo Kondo; Takami Hirai, both of Nishikamo-Gun; Minoru Imaeda, Nagoya, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/389,765

(22) Filed: Sep. 2, 1999

(30) Foreign Application Priority Data

Sep. 11, 1998 (JP) .................................................. 10-258292

(51) Int. Cl.$^7$ ...................................................... G02F 1/035
(52) U.S. Cl. .......................... 385/2; 385/3; 385/4; 385/5; 385/8; 385/9; 385/14; 385/15
(58) Field of Search ................................. 385/2, 3, 4, 5, 385/8, 9, 14, 15

(56) References Cited

U.S. PATENT DOCUMENTS

| | | | |
|---|---|---|---|
| 4,387,343 | 6/1983 | Kondo | 332/7.51 |
| 4,685,763 | * 8/1987 | Tada et al. | 359/245 |
| 5,313,535 | 5/1994 | Williams | 385/14 |
| 5,680,497 | * 10/1997 | Seino et al. | 385/129 |
| 5,748,358 | * 5/1998 | Sugamata et al. | 359/245 |
| 5,815,610 | * 9/1998 | Tokano et al. | 385/2 |

FOREIGN PATENT DOCUMENTS

| | | |
|---|---|---|
| 0 413 568 A2 | 2/1991 | (EP) . |
| 0 828 175 A2 | 3/1998 | (EP) . |
| 10-133159 | 5/1998 | (JP) . |

OTHER PUBLICATIONS

Database WPI, Week 199345, Derwent Publications Ltd., London, GB; JP 05 257104 A (Hikari Keisoku Gijutsu Kaihatsu KK) Oct. 8, 1993, abstract.

* cited by examiner

Primary Examiner—Mohammad Sikder
(74) Attorney, Agent, or Firm—Burr & Brown

(57) ABSTRACT

An optical waveguide element includes a substrate showing electrooptical effects and having a pair of major planes opposed with each other, an optical waveguide formed on one major plane of the substrate, and an electrode for applying a modulation signal to an optical wave transmitted through the optical waveguide. In the optical waveguide element mentioned above, there are a thin thickness portion having a relatively thin thickness formed to a portion of said substrate at least positioned correspondingly to said electrode; and a buffer layer formed between said substrate and said electrode, wherein an impedance conformity with the modulation signal applied to said electrode is performed by controlling a thickness of said thin thickness portion.

4 Claims, 1 Drawing Sheet

OPTICAL WAVEGUIDE ELEMENT

BACKGROUND OF THE INVENTION

1. Field of the Invention

The present invention relates to an optical waveguide element and especially relates to an optical waveguide element used preferably for an optical waveguide device of a traveling-wave type which can perform a high speed modulation.

2. Description of Related Art

Recently, the optical waveguide device has been used as an external modulator according to an improvement of optical fiber communication system which permits high speed and large capacity signal transmissions. Since the external modulator mentioned above is used under a condition such that a high speed switching operation is required, the optical waveguide device used as the external modulator needs a high speed modulating property. To this end, there have been known some techniques such that an electrode, for applying the modulation signal, of the optical waveguide element which constructs the optical waveguide device is shaped particularly or that a buffer layer made of for example silicon dioxide is formed between the electrode and a substrate which constructs the optical waveguide element.

However, in the techniques mentioned above, there are drawbacks such that a producing cost is increased since producing steps of the electrode are complicated and that a positioning precision of the electrode is deteriorated when the buffer layer is formed. In order to eliminate the drawbacks mentioned above, the applicant disclosed, in Japanese Patent Laid-Open Publication No. 10-133159 (JP-A-10-133159), an optical waveguide element wherein a thickness of a portion of the substrate, which constructs the optical waveguide element, at least positioned correspondingly to the electrode is made thin so as to perform a high speed modulation.

However, in the case that the optical waveguide element mentioned above is used actually as the optical waveguide device in such a manner that an optical fiber is connected to the optical waveguide element and an electrical connector is further connected to the optical waveguide element so as to apply a modulation signal to the electrode, since a characteristic impedance of the optical waveguide device is relatively smaller than that of the modulation signal, an impedance matching therebetween is not sufficient. Therefore, there is a drawback such that a high frequency loss is increased.

SUMMARY OF THE INVENTION

An object of the present invention is to provide an optical fiber element which can perform an impedance matching of an optical waveguide device and decrease a high frequency loss of the optical fiber device which it is used in the optical fiber device.

According to the invention, an optical waveguide element including a substrate showing electrooptical effects and having a pair of major planes opposed with each other, an optical waveguide formed on one major plane of said substrate, and an electrode for applying a modulation signal to an optical wave transmitted through said optical waveguide, comprises; a thin thickness portion having a relatively thin thickness formed to a portion of said substrate at least positioned correspondingly to said electrode; and a buffer layer formed between said substrate and said electrode, wherein an impedance conformity with the modulation signal applied to said electrode is performed by controlling a thickness of said thin thickness portion.

The inventors investigated how to decrease a high frequency loss of the optical waveguide element and found the following facts.

It is well known that a thickness of the electrode is inversely proportional to a characteristic impedance of the optical waveguide element and that a thickness of the buffer layer is directly proportional to a characteristic impedance of the optical waveguide element. That is to say, if a thickness of the electrode is increased, a characteristic impedance is decreased correspondingly. Moreover, if a thickness of the buffer layer is increased, a characteristic impedance is increased correspondingly.

Under such an assumption, the inventors investigated eagerly a technique for improving a characteristic impedance of the optical waveguide element. As a result, the inventors found that, when the buffer layer made of for example $SiO_2$ was formed between the substrate and the electrode and the thin thickness portion was formed in the substrate at a portion corresponding to the electrode, a characteristic impedance of the optical wavelength element was varied in response to a thickness of the thin thickness portion. That is to say, the inventors found an unexpected phenomena such that a characteristic impedance of the optical waveguide element was decreased if a thickness of the thin thickness portion was increased and a characteristic impedance of the optical waveguide element was increased if a thickness of the thin thickness portion was decreased. The present invention is achieved on the basis of the facts that the inventors found as mentioned above.

According to the invention, since a characteristic impedance of the optical waveguide element can be matched correctly with that of the modulation signal i.e. an external high frequency power source, it is possible to achieve a lowering of high frequency loss.

DESCRIPTION OF THE PREFERRED EMBODIMENT

Figure 1:
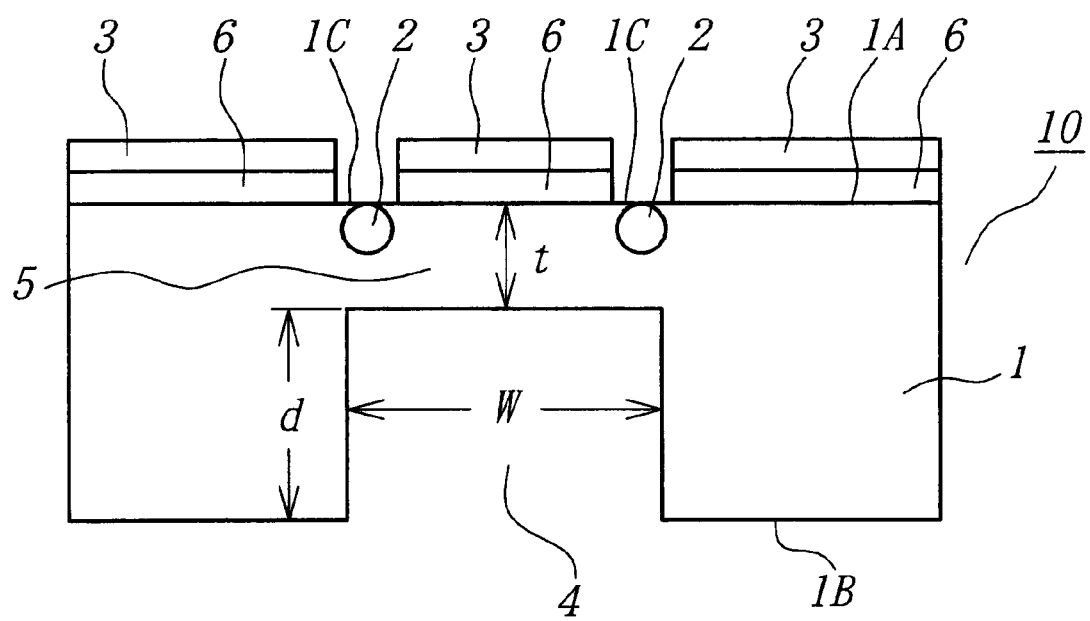
FIG. 1 is a cross sectional view showing one embodiment of an optical waveguide element according to the invention.

FIG. 1 is a cross sectional view showing one embodiment of an optical waveguide element according to the invention. In the optical waveguide element shown in FIG. 1, optical waveguides 2 and electrodes 3 are formed to one major plane 1A of a substrate 1 having electrooptical effects. Moreover, in the other major plane 1B of the substrate 1 opposed to the major plane 1A, a depression portion 4 is formed at a portion corresponding to the electrode 3 so as to form a thin thickness portion 5 of an optical waveguide element 10. Further, buffer layers 6 are formed between the major plane 1A of the substrate 1 and the electrodes 3.

As mentioned above, in the optical waveguide element 10 according to the invention shown in FIG. 1, the thin thickness portion 5 is formed at a portion corresponding to the electrode 3 and the buffer layers 6 are formed between the substrate 1 and the electrodes 3. In this case, it is possible to control a characteristic impedance of the optical waveguide element 10 by varying a thickness t of the thin thickness portion 5. Therefore, it is possible to perform an impedance matching with a modulation signal by setting a thickness of the thin thickness portion 5 to a suitable value. As a result, a high frequency loss of the optical waveguide element 10 can be decreased.

In the embodiment shown in FIG. 1, the buffer layers 6 are formed only between the substrate 1 and the electrodes 3 and are not formed at portions 1C of the substrate 1 to which no electrodes 3 exist. When the optical waveguide element 10 has a construction mentioned above, a leakage percentage of a microwave, which is a modulation signal applied to the electrode 3, from the buffer layer 6 having a relatively high permittivity and a high refractive index to an air layer having a relatively low permittivity and a low refractive index, is increased. As a result, an effective refractive index of the microwave is further decreased, and thus it is possible to improve a speed matching with an optical wave transmitted through the optical waveguide 2.

In the embodiment mentioned above, the buffer layer 6 are not formed to the portions 1C to which no electrodes 3 exist. However, the present invention may be achieved sufficiently even in the case that the buffer layer 6 is formed uniformly on all the major plane 1A of the substrate 1 and then the buffer layer 6 is formed to the portions 1C.

In the embodiment, a frequency band of a microwave modulation signal used in the optical waveguide element 10 is 1 MHz–100 GHz. Therefore, it is preferred to set a lower limit of a thickness of the buffer layer 6 to 0.1 μm more preferably 0.3 μm so as to perform an impedance matching with a modulation signal i.e. an external high frequency power source and to further decrease a high frequency loss in this frequency band. On the same reason, it is preferred to set an upper limit of a thickness of the buffer layer 6 to 2 μm more preferably 1.8 μm.

Moreover, it is preferred to set an upper limit of a thickness t of the thin thickness portion 5 to 200 μm more preferably 100 μm so as to perform an impedance matching with the external high frequency power source in response to a thickness of the buffer layer 6 in this frequency band and to decrease a high frequency loss. Further, it is preferred to set a lower limit of a thickness t of the thin thickness portion 5 to 5 μm more preferably 10 μm so as to maintain a sufficient strength when the optical waveguide element 10 is handled in addition to decrease a high frequency loss due to the impedance matching mentioned above.

As a material to be used for the substrate 1, all the materials can be used if they show electrooptical effects, and one example use may be made of lithium niobate, kalium-lithium niobate, lithium tantalate, KTP, glass, silicon, GaAs and quartz crystal. As a material to be used for the optical waveguide 2, all the materials can be used if they are dissolved uniformly as a solid-solution in the substrate having electrooptical effects and then a material having a refractive index higher than that of the substrate is formed, and one example use may be made of titanium, nickel, copper, zinc, chromium and so on. Moreover, the optical waveguide may be formed as a rib type by means of a rib type by means of a ridge working. As a material to be used as the electrode 3, all the materials can be used if then show a low resistance and an excellent impedance property, and one example use may be made of gold, silver, copper and so on. As a material to be used for the buffer layer 6, use may be made of a known material such as silicon oxide, magnesium fluoride, silicon nitride, and alumina which are used for a speed matching.

The optical waveguide element 10 can be produced by using the known method for example disclosed in JP-A-10-133159. That is to say, the optical waveguide element 10 is formed in the following manner. At first, a mask pattern for the waveguide is formed on the substrate 1 by using a photolithography technique. After that, a substance made of for example titanium as mentioned above is deposited by means of for example vapor deposition method on the substrate via the mask pattern for the waveguide. Then, the mask pattern for the waveguide is removed by using organic solvent. As a result, the waveguide pattern is formed on the substrate 1. Then, the substrate 1, on which the waveguide pattern is formed, is set in a high temperature electric furnace and is subjected to a heat treatment. In the heat treatment, a substance such as titanium which constructs the waveguide pattern is diffused by heat into the substrate 1 to form the optical waveguide 2.

Then, a substance such as silicon oxide is deposited uniformly on the substrate 1 by means of for example vapor deposition method. After that, the buffer layer 6 is formed thereon by means of a photolithography technique, as is the same as the explanation mentioned above, and further a base electrode made of for example gold is formed thereon by means of vapor deposition method. Then, the electrode made of for example gold is formed on the base electrode by means of plating method by using an exclusive mask having an opening portion corresponding to the buffer layer 6. Then, the base electrode other than the electrode is removed by means of for example ion trimming method. As a result, the electrode 3 is formed. Then, a resist is applied on the electrode 3 of the substrate 1. After that, the substrate 1 is fixed to a working bed by using adhesive. Then, a depression portion 4 is formed to the substrate 1 at the major plane 1B side by means of mechanical working or laser abrasion, and an end surface of the substrate 1 is ground. After that, the substrate 1 is cut into chips by using a dicing method. As a result, the optical waveguide element 10 as shown in FIG. 1 can be obtained.

As the mechanical working, use is made of a method such as dicing or micro blinding. Moreover, in the case that the depression portion 4 is formed by means of laser abrasion, use is made of excimer laser such as ArF and KrF having a high intensity per a unit of exciting laser. Further, in the case that the buffer layer 6 is formed on all the major plane 1A of the substrate 1 so as to form the buffer layer 6 even on the portion 1C to which no electrode 3 exist, a photolithography step for forming the buffer layer 6 can be eliminated.

Hereinafter, the present invention will be explained in detail with reference to the experiment.

EXAMPLE 1

In this example, the optical waveguide element having the construction shown in FIG. 1 was produced. An X-cut plate made of lithium niobate having a thickness of 1 mm was used as the substrate 1. At first, the optical waveguide 2 made of Ti was formed on the major plane 1A of the substrate 1 by using the method mentioned above. Then, silicon oxide was deposited uniformly on the major plane 1A of the substrate 1 by means of vapor deposition method. After that, the buffer layer 6 having a thickness of 1.1 μm was formed thereon by means of photolithography technique as mentioned above.

Then, the electrode 3 made of gold having a thickness of 10 μm was formed by means of vapor deposition method and plating method as mentioned above. Then, a resist was applied on a surface of the electrode 3. After that, the depression portion 4 having a depth d of 0.8 mm and a width w of 100 μm was formed by means of dicing method by performing a few grinding operations by a #400 whetstone having a diameter of 0.2 mm (whetstone ①) under a condition of revolution: 30000 rpm and stepping speed: 120 mm/min. Then, the depression portion 4 was further worked by means of dicing method by performing a few grinding operations by a #1000 whetstone having a diameter of 0.1 mm (whetstone ②). Then, the substrate 1 was cut into chips each having a dimension of 2×10×1t mm, and then the chips were washed. In this manner, the optical waveguide elements 10 each having a thickness t of the thin thickness portion 5 as shown in the following Table 1 were produced.

Then, the optical fiber (not shown) was connected to the optical waveguide 2 of the optical waveguide element 10 by using UV hardening resin after aligning an optical axis between the optical fiber and the optical waveguide 2. In addition, the electrical connector (not shown) was connected to the electrode 3. After that characteristic impedance of the optical waveguide elements 10 in a microwave frequency band of DC-40 GHz were measured by using network analyzer. The results are shown in Table 1.

Comparative Example 1

The optical waveguide elements were produced in the same manner as that of the example 1 other than that the thin thickness portion 5 was not formed. Then, as is the same as the example 1, characteristic impedance of the optical waveguide elements thus produced were measured. The results are also shown in Table 1.

TABLE 1

| thickness t of thin thickness portion (μm) | characteristic impedance (Ω) | |
|---|---|---|
| | example 1 | comparative example 1 |
| >200(*) | — | 43 |
| 200 | 45 | — |
| 100 | 46 | — |
| 50 | 47 | — |
| 20 | 49 | — |
| 10 | 50 | — |
| 5 | 52 | — |

(*): no thin thickness portion is formed.

As is clearly understood from example 1 and comparative example 1 shown in Table 1, in the case that a microwave having a frequency band if DC-40 GHz was applied to the optical waveguide element as a modulation signal, in the optical waveguide element according to the invention (example 1) where the buffer layer was formed between the substrate and the electrode and the thin thickness portion was formed in the substrate at a portion corresponding to the electrode, it is possible to improve values of the characteristic impedance from 45 Ω to 52 Ω. Therefore, it is possible to match a characteristic impedance of the optical waveguide element with that of 50 Ω which is a characteristic impedance of the modulation signal i.e. the external high frequency power source by selecting suitably a thickness of the thin thickness portion 5. As a result, it is possible to reduce a high frequency loss of the optical waveguide element.

As mentioned above, according to the invention, since the thin thickness portion is formed in the substrate at a portion to which at least electrode 3 exists and the buffer layer is formed between the substrate and the electrode, it is possible to perform an impedance matching of the optical waveguide element with a modulation signal applied to the electrode and to reduce a high frequency loss by controlling a thickness of the thin thickness portion. Moreover, in the case that the buffer layer is formed only between the substrate and the electrode and is not formed to the other portion, it is possible to further improve a speed matching between the microwave modulation signal and the optical wave.

What is claimed is:

1. An optical waveguide element including a substrate that exhibits electrooptical effects and has a pair of major planes opposed with each other, an optical waveguide formed on one major plane of said substrate, and an electrode for applying a modulation signal to an optical wave transmitted through said optical waveguide, comprising:

a first thinned portion formed in a portion of said substrate at least positioned correspondingly to said electrode; and a buffer layer formed between said substrate and said electrode;

wherein an impedance conformity with the modulation signal applied to said electrode is performed by controlling a thickness of said first thinned portion.

2. The optical waveguide element according to claim 1, wherein a thickness of said buffer layer is 0.1–2 μm.

3. The optical waveguide element according to claim 2, wherein a thickness of said first thinned portion of the substrate is 5–200 μm.

4. The optical waveguide element according to claim 1, wherein said buffer layer is formed only between said substrate and said electrode and is not formed on the substrate on which no electrode exists.

* * * * *